US008864083B1

(12) United States Patent
Shmilovich et al.

(10) Patent No.: US 8,864,083 B1
(45) Date of Patent: Oct. 21, 2014

(54) LOW NOISE WING SLAT SYSTEM WITH A FIXED WING LEADING EDGE AND DEPLOYABLE BRIDGING PANELS

(75) Inventors: Arvin Shmilovich, Huntington Beach, CA (US); Yoram Yadlin, Irvine, CA (US)

(73) Assignee: The Boeing Company, Chicago, IL (US)

( * ) Notice: Subject to any disclaimer, the term of this patent is extended or adjusted under 35 U.S.C. 154(b) by 339 days.

(21) Appl. No.: 12/751,514

(22) Filed: Mar. 31, 2010

(51) Int. Cl.
 *B64C 3/50* (2006.01)

(52) U.S. Cl.
 USPC .......................................... 244/215

(58) Field of Classification Search
 USPC .................. 244/201, 211, 214, 215, 216, 1 N
 See application file for complete search history.

(56) References Cited

U.S. PATENT DOCUMENTS

| | | | | |
|---|---|---|---|---|
| 4,285,482 | A * | 8/1981 | Lewis | 244/207 |
| 4,399,970 | A * | 8/1983 | Evans | 244/214 |
| 4,702,441 | A * | 10/1987 | Wang | 244/204 |
| 4,752,049 | A * | 6/1988 | Cole | 244/134 B |
| 6,328,265 | B1 | 12/2001 | Dizdarevic | |
| 6,394,396 | B2 * | 5/2002 | Gleine et al. | 244/198 |
| 6,454,219 | B1 * | 9/2002 | Moe | 244/214 |
| 6,457,680 | B1 * | 10/2002 | Dobrzynski et al. | 244/210 |
| 6,536,714 | B2 | 3/2003 | Gleine et al. | |
| 6,789,769 | B2 * | 9/2004 | Mau et al. | 244/214 |
| 7,270,305 | B2 * | 9/2007 | Rampton et al. | 244/214 |
| 2002/0195527 | A1 | 12/2002 | Broadbent | |
| 2007/0102587 | A1 | 5/2007 | Jones et al. | |
| 2008/0179464 | A1 | 7/2008 | Bender et al. | |
| 2008/0265103 | A1 | 10/2008 | Wood | |
| 2011/0240803 | A1 | 10/2011 | Shmilovich et al. | |

FOREIGN PATENT DOCUMENTS

| | | |
|---|---|---|
| DE | 10 2004 056537 A1 | 6/2006 |
| EP | 1 147 985 A2 | 10/2001 |
| FR | 1 011 175 A | 6/1952 |

OTHER PUBLICATIONS

Andreou, et al., Abstract entitled, "Aeroacoustic Comparison of Airfoil Leading Edge High-Life Geometries and Supports," presented at the 45th American Institute of Aeronautics and Astronautics (AAIA) Aerospace Sciences Meeting and Exhibit, Jan. 8-11, 2007, Reno, Nevada;AIAA 2007-230; 20 Pages.

(Continued)

*Primary Examiner* — Tien Dinh
*Assistant Examiner* — Keith L Dixon
(74) *Attorney, Agent, or Firm* — Hope Baldauff, LLC (57) ABSTRACT

Concepts and technologies described herein provide for a low noise aircraft wing slat system. According to one aspect of the disclosure, a wing slat is used in conjunction with upper and lower bridging elements to minimize airframe noise associated with a high lift system during takeoff and landing flight operations. An upper bridging element deploys from a slat or an aircraft wing during deployment of the slat for takeoff operations and creates a continuous aerodynamic surface between the slat and an upper surface of the wing leading edge to improve the airflow and reduce drag. A lower bridging element deploys from the wing during cruise flight to bridge a gap between a lower surface of a stowed leading edge slat and a lower surface of the wing. During landing operations, both upper and lower bridging elements remain stowed to optimize ambient airflow for noise abatement and lift creation.

18 Claims, 5 Drawing Sheets

(56) References Cited

OTHER PUBLICATIONS

Kolb, et al., Abstract entitled, "Aeroacoustic Wind Tunnel Measurements on a 2D High-Lift Configuration," presented at the 13$^{th}$ AIAA/CEAS Aeroacoustics Conference, 28$^{th}$ American Institute of Aeronautics and Astronautics (AAIA) Aeroacoustics Conference, May 21-23, 2007, Reno, Nevada; AIAA 2007-3447; 19 Pages.

Imamura, et al., Abstract entitled, "Designing of Slat Cove Filler as a Noise Reduction Device for Leading-Edge Slat," presented at the 13$^{th}$ AIAA/CEAS Aeroacoustics Conference, 28$^{th}$ American Institute of Aeronautics and Astronautics (AAIA) Aeroacoustics Conference, May 21-23, 2007, Reno, Nevada; AIAA 2007-3473; 17 Pages.

Imamura, et al., Abstract entitled, "Numerical and Experimental Research of Low-Noise Slat Using Simplified High-Lift Model," presented at the 14$^{th}$ AIAA/CEAS Aeroacoustics Conference, 29$^{th}$ American Institute of Aeronautics and Astronautics (AAIA) Aeroacoustics Conference, May 5-7, 2008, Vancouver, British Columbia Canada; AIAA 2008-2918; 18 Pages.

International Search Report and Written Opinion dated Jul. 19, 2011 in PCT/US2011/026479.

U.S. Official Action dated Feb. 16, 2012 in U.S. Appl. No. 12/751,419.

U.S. Official Action dated Apr. 16, 2012 in U.S. Appl. No. 12/751,468.

U.S. Notice of Allowance dated Jun. 26, 2012 in U.S. Appl. No. 12/751,419.

U.S. Notice of Allowance dated Dec. 6, 2012 in U.S. Appl. No. 12/751,468.

U.S. Office Action dated Nov. 9, 2012 in U.S. Appl. No. 13/593,609.

* cited by examiner

LOW NOISE WING SLAT SYSTEM WITH A FIXED WING LEADING EDGE AND DEPLOYABLE BRIDGING PANELS

BACKGROUND

Reducing noise levels associated with airport environments has become a progressively higher priority within the aircraft industry. However, increasingly stringent noise regulations have resulted in an increase in air traffic inefficiencies and a reduction in airport productivity. For example, at many airports, current capacity is largely controlled by the hours of operations, which are typically confined to mostly daylight hours in order to prevent or mitigate noise pollution. During aircraft takeoff, approach, and landing operations, noise is generated in large part by the aircraft engines and airframe components. With the advent of high bypass ratio engines, a significant reduction in engine noise has been achieved, with continued advancements being made.

A significant source of airframe noise originates with the aircraft high-lift system. In particular, slotted leading edge slats produce high noise levels because of the flow recirculation that occurs in a cove region located on a rear side of a deployed leading edge wing slat. Conventional wing slats are configured to mate with the leading edge of the aircraft wings so that each slat and wing together create a desired airfoil shape when the slat is retracted against the leading edge of the wing. In doing so, conventional slats may have a leading edge that is substantially shaped like the leading edge of the wing, but have a rear side that is generally concave in shape as it is shaped to mate with the generally convex leading edge of the wing. When the slat is extended forward and rotated downward for high lift operations, the concave shape of the rear side of the slat creates a cove in which the ambient airstream flowing around the slat recirculates, creating noise.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Concepts and technologies described herein provide for reducing aerodynamic noise levels associated with aircraft high lift systems. According to one aspect of the disclosure provided herein, a method for reducing aircraft noise associated with a high-lift system includes deploying a slat from a fixed leading edge of an aircraft wing to a takeoff position. An upper bridging element is deployed from a stowed position to a deployed position upon deployment of the slat. When configured in the deployed position, the upper bridging element creates a continuous aerodynamic surface between the slat and an upper surface of the fixed leading edge of the aircraft wing.

According to another aspect, a high lift system includes a cove-filled leading edge wing slat, an aircraft wing, a deployable upper bridging element, and a deployable lower bridging element. The aircraft wing includes an upper surface, a lower surface, and a fixed leading edge. The deployable upper bridging element deploys when the slat is deployed to a takeoff position. In this position, the upper bridging element creates a continuous aerodynamic surface between the slat and the upper surface of the fixed leading edge of the wing. The deployable lower bridging element deploys when the slat is retracted to the stowed position against the fixed leading edge of the aircraft wing. The deployable lower bridging element creates a continuous aerodynamic surface between the slat and the lower surface of the wing.

According to yet another aspect of the disclosure, a method for reducing aircraft noise associated with a high-lift system includes deploying a slat from a stowed position against a fixed leading edge of an aircraft wing to a takeoff position. Concurrently with the slat deployment, an upper bridging element is deployed from a stowed position to a deployed position that creates a continuous aerodynamic surface between the slat and an upper surface of the fixed leading edge of the wing. The slat is then retracted from the takeoff position to the stowed position for cruise flight. While retracting the slat to the stowed position, the upper bridging element is retracted to the stowed position. The slat is then deployed from the stowed position to a landing position while the upper bridging element is maintained in the stowed position.

The features, functions, and advantages that have been discussed can be achieved independently in various embodiments of the present disclosure or may be combined in yet other embodiments, further details of which can be seen with reference to the following description and drawings.

DETAILED DESCRIPTION

Figure 1:
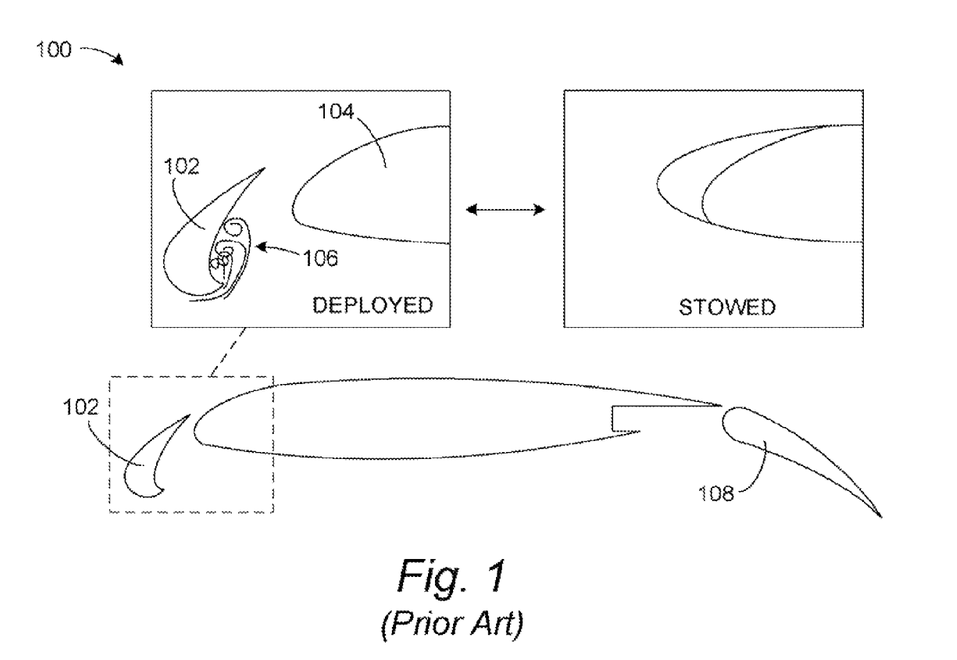
FIG. 1 is a cross-sectional view of a conventional high lift system showing a conventional leading edge slat in deployed and stowed configurations with corresponding noise-inducing airflow recirculation within the slat cove.

The following detailed description is directed to systems and methods for providing a high lift system that utilizes cove-filled leading edge wing slats to eliminate or reduce the noise-creating air recirculation associated with conventional leading edge wing slats. In the following detailed description, references are made to the accompanying drawings that form a part hereof, and which are shown by way of illustration, specific embodiments, or examples. Like numerals represent like elements through the several figures. Referring now to FIG. 1, a conventional high lift system 100 will be described.

The conventional high lift system 100 may include a conventional leading edge slat 102 and flap 108 that work together to alter the shape of an aircraft wing 104 to create additional aerodynamic lift. The conventional leading edge slat 102 is configured to mate with the leading edge of a conventional aircraft wing 104 so that the conventional slat 102 and wing 104 together create a desired airfoil shape, as shown with the conventional slat 102 positioned in the stowed configuration. Because the conventional slat 102 and conventional aircraft wing 104 must create a desired airfoil shape when the conventional slat 102 is retracted against the leading edge of the wing in the stowed configuration, and because the conventional aircraft wing 104 must retain an airfoil shape when the conventional slat 102 is extended to the deployed configuration, traditionally, the rear side of a conventional slat 102 has a concave shape that substantially corresponds to the convex shape of the leading edge of the conventional aircraft wing 104 to allow the two surfaces to mate when the conventional slat 102 is stowed.

However, as discussed above, and as shown in FIG. 1, the concave shape of the rear side of the conventional slat 102 creates a cove region that results in a recirculation 106 of the ambient airflow as it flows around the conventional slat 102. It is this recirculation 106 of the ambient airflow that is the source of a substantial amount of noise during takeoff and landing operations. In addition to the noise created by the cove region of the conventional slat 102, the air recirculation 106 within the cove region is not aerodynamically optimal, reducing the amount of lift, increasing the amount of drag, thereby reducing the corresponding aircraft performance benefits that could result should this recirculation 106 be eliminated.

Figure 2:
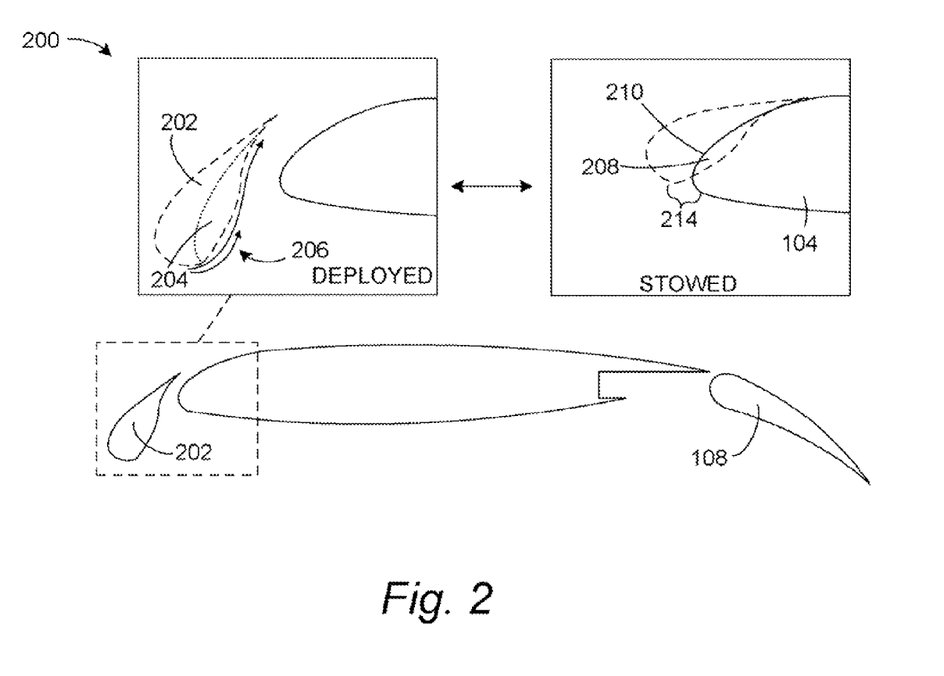
FIG. 2 is a cross-sectional view of a high lift system showing a cove-filled leading edge slat in deployed and stowed configurations according to various embodiments presented herein.

FIG. 2 illustrates a high lift system 200 that takes advantage of a cove-filled leading edge slat 202 to decrease or eliminate the air recirculation 106 and corresponding noise and performance degradation that results from the recirculation 106. As seen in FIG. 2, the leading edge wing slat is a cove-filled slat 202 in which the cove region 204 has been filled to eliminate the convex portion of the rear side of the slat that is common to a conventional slat 102. The filled cove region 204 provides a smooth, gradual turn for the ambient airflow, creating a substantially continuous flow 206 that substantially reduces the noise associated with the recirculation 106 present with conventional slats. It should be appreciated that the substantially continuous flow 206 may include laminar flow, turbulent flow, or a combination thereof according to the precise design characteristics of the high lift system 200 and the corresponding flight characteristics at any given instance. However, the cove-filled leading edge slat 202 substantially reduces or eliminates the considerable recirculation 106 that is present within the cove of the conventional slat 102, which substantially reduces the airframe noise associated with this recirculation 106.

The cove-filled slat 202 may be shaped and sized according to the specific application and corresponding desirable aerodynamic properties. According to the various embodiments described herein, the cove-filled slat is rigid so that the rear side of the cove-filled slat 202 is not flexible or inflatable in that it retains the same cross-sectional shape when deployed as when stowed. Various implementations and further details with respect to the cove-filled slat 202 are described in U.S. patent application Ser. No. 12/751,468, entitled "Low Noise Wing Slat System With Rigid Cove-Filled Slat", now U.S. Pat. No. 8,424,810 and filed concurrently with the present application on Mar. 31, 2010, which is herein incorporated by reference in its entirety.

As seen in FIG. 2, the stowed configuration of the cove-filled slat 202 creates an overlap area 208 in which the cove region 204 overlaps or interferes with the leading edge 210 of a conventional aircraft wing 104. Utilizing the concepts and technologies described herein, this overlap area 208 is accommodated by shaping the cove-filled slat 202 and leading edge 210 of the aircraft wing so that the slat and leading edge abut one another without interference. Doing so creates a gap width 214 between a lower portion of the cove-filled slat 202 and a lower surface of the aircraft wing 104 when the slat is stowed. In order to bridge this gap width 214, a bridging element is deployed from the lower surface of the wing when the cove-filled slat 202 is configured in the stowed position. Similarly, when the cove-filled slat 202 is configured in a takeoff position, a bridging element is deployed from the top surface of the wing or from the slat itself to enhance aircraft performance. These bridging elements will be described in detail below with respect to FIGS. 5A-7C. Methods for resolving the overlap area 208 utilizing a moveable leading edge of the aircraft wing 104 are described in U.S. patent application Ser. No. 12/751,419, entitled "Low Noise Wing Slat System With Deployable Wing Leading Edge Elements", now U.S. Pat. No. 8,276,852 and filed concurrently with the present application on Mar. 31, 2010, which is herein incorporated by reference in its entirety.

Figure 3A:
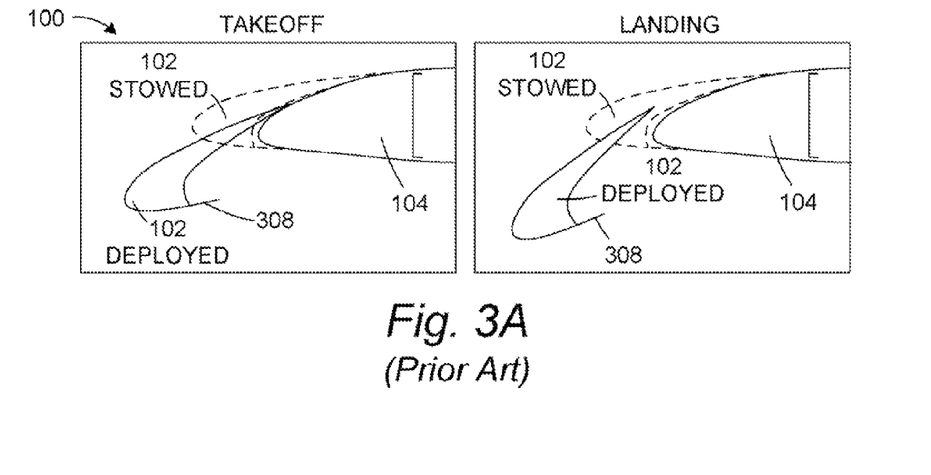
FIG. 3A is a cross-sectional view of a conventional high lift system showing a conventional leading edge slat in takeoff and landing configurations.

Prior to discussing the various embodiments associated with the cove-filled slat 202 and bridging elements, the conventional high lift system 100 will be discussed in greater detail with respect to FIG. 3A for comparison purposes. Looking at FIG. 3A, the conventional slat 102 is shown in solid lines in the takeoff and landing positions. The conventional slat 102 is depicted in broken lines in the stowed position. As seen in the stowed position, a rear side of the conventional slat 102 is generally concave to compliment the generally convex leading edge of the conventional aircraft wing 104. A guide rail (not shown) connects the conventional slat 102 to a wing spar or other structural component of the conventional aircraft wing 104. A rotary actuator and pinion gear (not shown) operate to extend and retract the conventional slat 102 on the guide rail between the various positions.

Conventional slats 102 often include a bottom plate 308, which may provide a connection point for the guide rail, as well as providing an aerodynamic transition between the bottom side of the conventional slat 102 and a lower surface of the aircraft wing 104, guiding the ambient airflow around the conventional slat 102 and the lower surface of the aircraft wing 104 when the slat is configured in the stowed position. However, when the conventional slat 102 is configured in the deployed position, the bottom plate 308, coupled with the concave shape of the rear surface of the slat, creates the cove in which the noise producing air recirculation 106 occurs as the ambient airflow streams around the bottom of the slat.

Figure 3B:
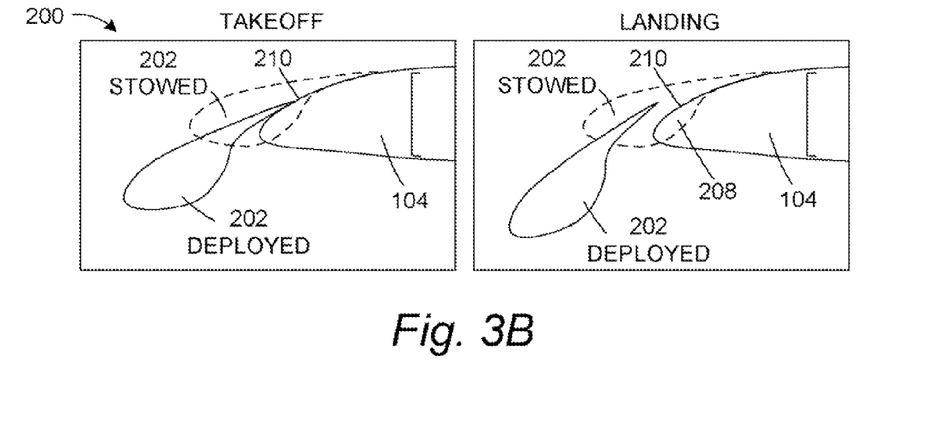
FIG. 3B is a cross-sectional view of a high lift system showing a cove-filled slat in takeoff and landing configurations and illustrating the interference between the cove-filled slat and a conventional aircraft wing according to various embodiments presented herein.

FIG. 3B shows further detail with respect to the overlap area 208 that is created if a cove-filled slat 202 were used with a conventional aircraft wing 104 in place of the conventional slat 102. As shown, the cove-filled slat 202 may extend down and forward during takeoff operations such that the trailing edge of the slat remains in contact with the leading edge 210 of the conventional aircraft wing 104, providing a continuous aerodynamic surface between the slat and an upper surface of the leading edge 210. While this contact is favorable, the shape of the leading edge 210 of the conventional aircraft wing 104 and of the cove-filled slat 202 prohibits the slat from nesting against the wing in a stowed configuration without interference in the overlap area 208, as is shown by the broken lines depicting the cove-filled slat 202 in the stowed position.

Figure 3C:
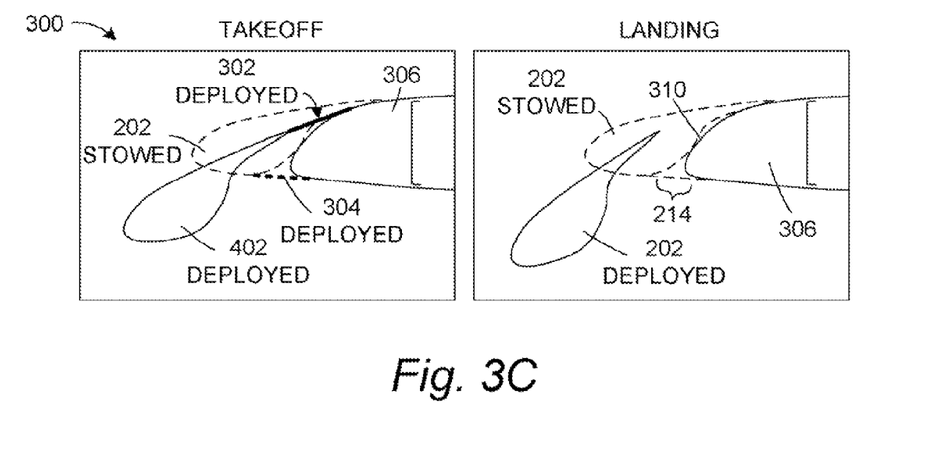
FIG. 3C is a cross-sectional view of a high lift system showing a cove-filled slat in takeoff and landing configurations with bridging elements as appropriate between the slat and an aircraft wing according to various embodiments presented herein.

To resolve the interference and eliminate the overlap area 208, the embodiments described herein shape the leading edge 310 of an aircraft wing 306 so as to shorten the width of the wing from leading edge 310 to trailing edge, or to otherwise shape the leading edge 310 to allow for the filled cove region 204 of the slat, as shown with respect to the high lift system 300 of FIG. 3C. It should be understood that the term "shortened" may be used herein to describe the aircraft wing 306 used within the high lift system 300. However, because wing widths and airfoil shapes and characteristics may differ from aircraft to aircraft, this term should be construed as being relative to an existing conventional aircraft wing 104 on any given aircraft. For example, should a conventional aircraft wing 104 on an existing aircraft be replaced or modified with an aircraft wing 306 having a high lift system 300 described herein, then the existing conventional aircraft wing 104 might be "shortened" or the leading edge 210 modified to accommodate the cove-filled slat 202, without adversely impacting airplane performance.

FIG. 3C shows that the shape of the leading edge 310 of the aircraft wing 306 may not be conducive to positioning the trailing edge of the cove-filled slat 202 in contact with the leading edge 310 of the aircraft wing 306 to provide the continuous aerodynamic surface between the slat and an upper surface of the leading edge 310 as shown and described above. Specifically, the increased downward slope of the leading edge 310 as compared to the conventional leading edge 210 may not allow for the cove-filled slat 202 to be effectively extended forward and downward to the takeoff position while remaining in contact with the leading edge 310 in a manner that provides an advantageous aerodynamic shape corresponding to the upper surface of the slat and the wing. As a result, embodiments described herein utilize a deployable upper bridging element 302 during takeoff to bridge the gap between the trailing edge of the cove-filled slat 202 and the upper surface of the leading edge 310 of the aircraft wing 306. Various implementations of this deployable upper bridging element 302 will be described below with respect to FIGS. 5A-7C.

Similarly, as discussed above, due to the aerodynamic and noise-abating shape of the cove-filled slat 202, a gap width 214 is created between a lower surface of the cove-filled slat 202 and the lower surface of the aircraft wing 306 when the slat is configured in the stowed position. Embodiments described herein provide for a deployable lower bridging element 304 that is extended from the aircraft wing 306 when the cove-filled slat 202 is stowed to bridge the gap width 214 and create a continuous aerodynamic surface between the lower surface of the slat and the lower surface of the aircraft wing 306. It should be understood that this disclosure is not limited to a lower bridging element 304 that deploys from the aircraft wing 306. Rather, a bridging element that deploys from a lower portion of the slat is described in U.S. patent application Ser. No. 12/751,468, entitled "Low Noise Wing Slat System With Rigid Cove-Filled Slat", now U.S. Pat. No. 8,424,810 and filed concurrently with the present application on Mar. 31, 2010, which is herein incorporated by reference in its entirety.

Figure 4A:
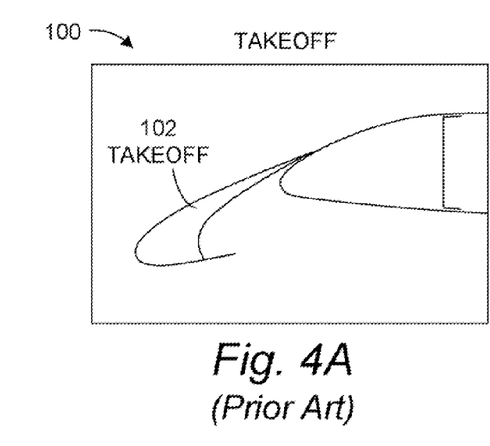
FIGS. 4A, 4B, and 4C are cross-sectional views of a conventional high lift system showing takeoff, cruise, and landing slat configurations, respectively.
Figure 4B:
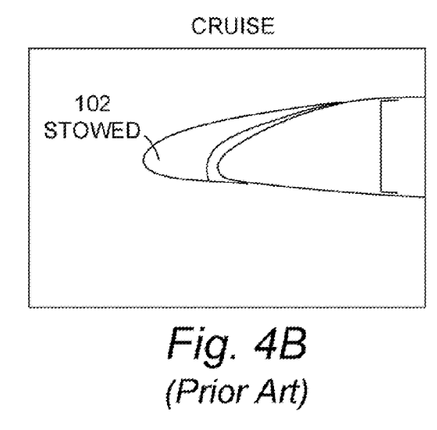
Figure 4C:
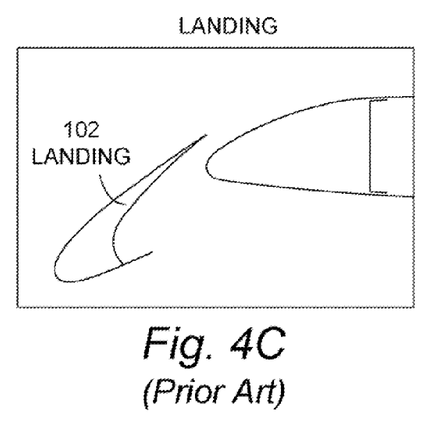

FIGS. 4A-4C show takeoff, cruise, and landing configurations of the conventional high lift system 100, which utilizes a conventional slat 102. These depictions are provided for comparison purposes to the high lift systems shown in FIGS. 5A-7C. It should become clear that the embodiments disclosed herein provide for improved noise abatement and lift creation characteristics as compared to the conventional high lift system 100.

Figure 5A:
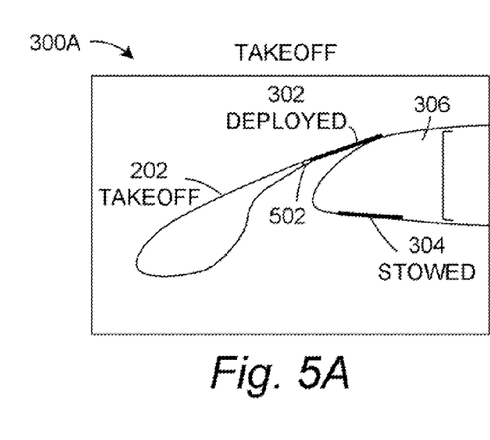
FIGS. 5A, 5B, and 5C are cross-sectional views of a high lift system showing takeoff, cruise, and landing slat configurations, respectively, utilizing an upper bridging element stowed with an aircraft wing according to various embodiments presented herein.
Figure 5B:
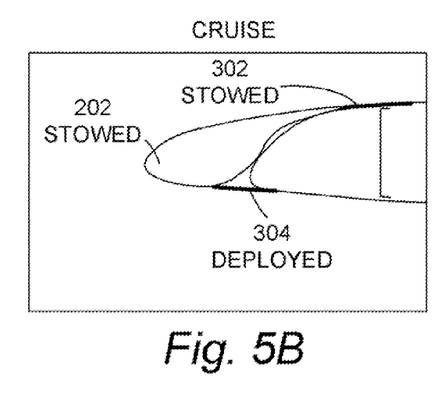
Figure 5C:
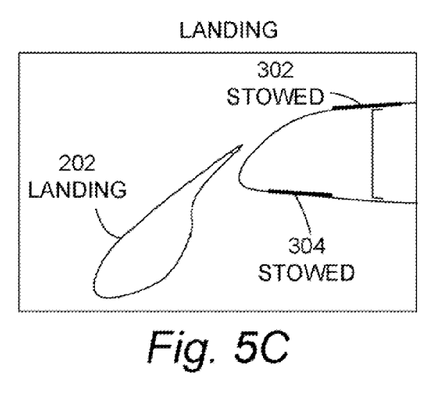

Turning now to FIGS. 5A-5C, a first embodiment of a low noise high lift system 300 will be discussed. According to this embodiment, a high lift system 300A includes a cove-filled slat 202, an aircraft wing 306, an upper bridging element 302, and a lower bridging element 304. As seen in FIG. 5A, during takeoff, the cove-filled slat 202 is extended forward and downward to the takeoff position. According to this embodiment, a slat trailing edge mechanism 502 is coupled with the upper bridging element 302. When the cove-filled slat 202 deploys to the takeoff position, the slat trailing edge mechanism 502 pulls the upper bridging element 302 from the stowed position on or within the aircraft wing 306 to a deployed position, bridging the cove-filled slat 202 and the upper surface of the fixed leading edge 310 of the aircraft wing 306.

The slat trailing edge mechanism 502 pushes the upper bridging element 302 back into the aircraft wing 306 to the stowed position when the cove-filled slat 202 is retracted for cruise flight conditions, as shown in FIG. 5B. FIG. 5C illustrates a landing configuration in which the slat trailing edge mechanism 502 disengages the upper bridging element 302, allowing the upper bridging element 302 to remain stowed while the cove-filled slat 202 extends forward and downward while rotating downward until configured in the landing position. According to various embodiments, the slat trailing edge mechanism 502 may include any mechanism operative to engage and disengage the upper bridging element 302.

The slat trailing edge mechanism 502 may be located solely at or near the trailing edge of the cove-filled slat 202, may be located on the upper bridging element 302, or may be located in part on both the slat and the upper bridging element. As an example, the slat trailing edge mechanism 502 may include a passive mechanism that engages the upper bridging element 302 via precise contact at a specific location and/or in a specific manner, such as a hook and latch combination, a projection and corresponding slot, or engaging tabs or other structural features on each component. Alternatively, the slat trailing edge mechanism 502 may include an active mechanism that engages and disengages via electrical, pneumatic, hydraulic, and/or magnetic means.

As discussed above, the high lift system 300A also includes a lower bridging panel 304 that is configured to bridge the gap between the lower surface of the cove-filled slat 202 and the lower surface of the aircraft wing 306 when the cove-filled slat 202 is configured in the stowed position, such as during cruise flight conditions. When the cove-filled slat 202 is deployed to the takeoff position, the lower bridging panel 304 is retracted to the stowed position on or within the lower surface of the aircraft wing 306. When the cove-filled slat 202 is retracted for cruise flight, the lower bridging panel 304 is extended outward to the deployed position. When the cove-filled slat 202 is deployed to the landing position, the lower bridging panel 304 is again retracted to the stowed position within the wing. The deployment and retraction of the lower bridging panel 304 may be actuated utilizing any type of actuator mounted on or within the aircraft wing 306.

Figure 6A:
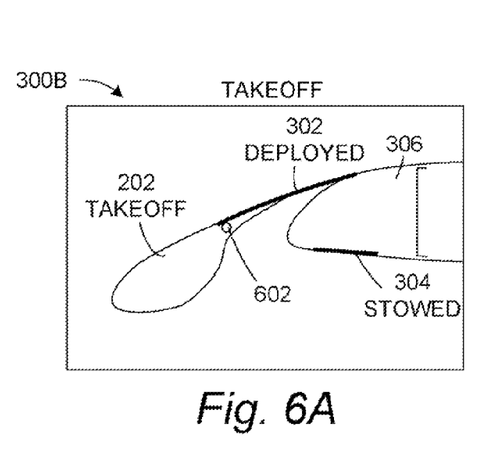
FIGS. 6A, 6B, and 6C are cross-sectional views of a high lift system showing takeoff, cruise, and landing slat configurations, respectively, utilizing an upper bridging element stowed with a slat according to embodiments presented herein.
Figure 6B:
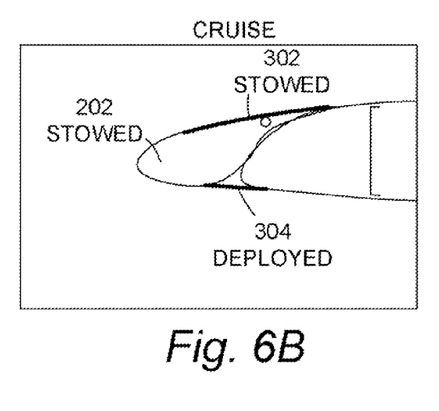
Figure 6C:
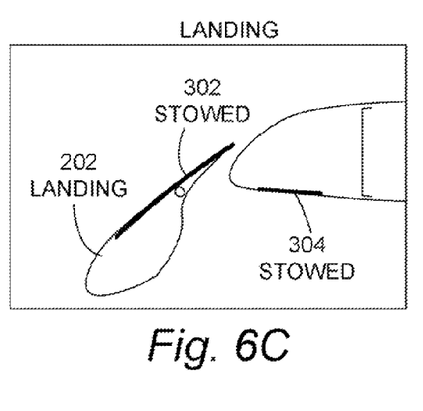
Figure 7A:
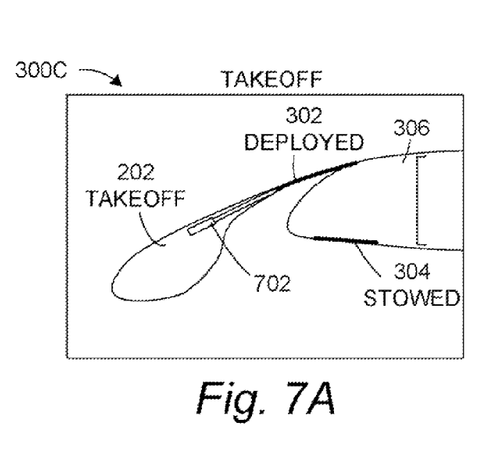
FIGS. 7A, 7B, and 7C are cross-sectional views of a high lift system showing takeoff, cruise, and landing slat configurations, respectively, utilizing an upper bridging element stowed with a slat according to alternative embodiments presented herein.
Figure 7B:
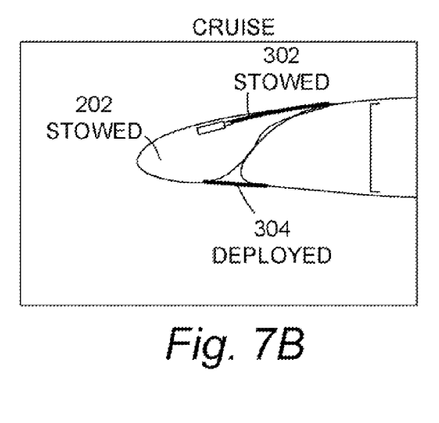
Figure 7C:
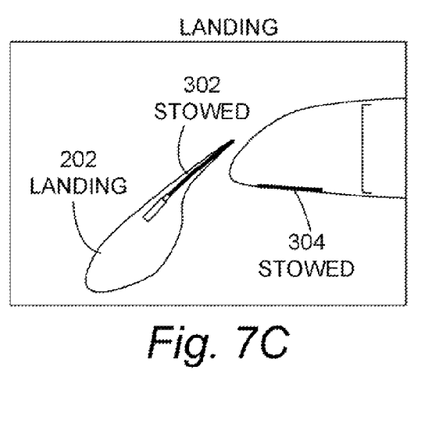

Turning now to FIGS. 6A-6C, a second embodiment of a low noise high lift system 300 is shown with respect to takeoff, cruise, and landing configurations, respectively. According to this embodiment, a high lift system 300B includes an upper bridging element 302 that is stowed within the cove-filled slat 202 rather than within the aircraft wing 306. Deployment and retraction of the upper bridging element 302 is actuated utilizing a rotary actuator and pinion gear 602. A third embodiment of a low noise high lift system 300 is shown in FIGS. 7A-7C in takeoff, cruise, and landing configurations, respectively. According to this embodiment, a high lift system 300C includes an upper bridging element 302 that is stowed within the cove-filled slat 202 and actuated utilizing a linear actuator 702.

Figure 8:
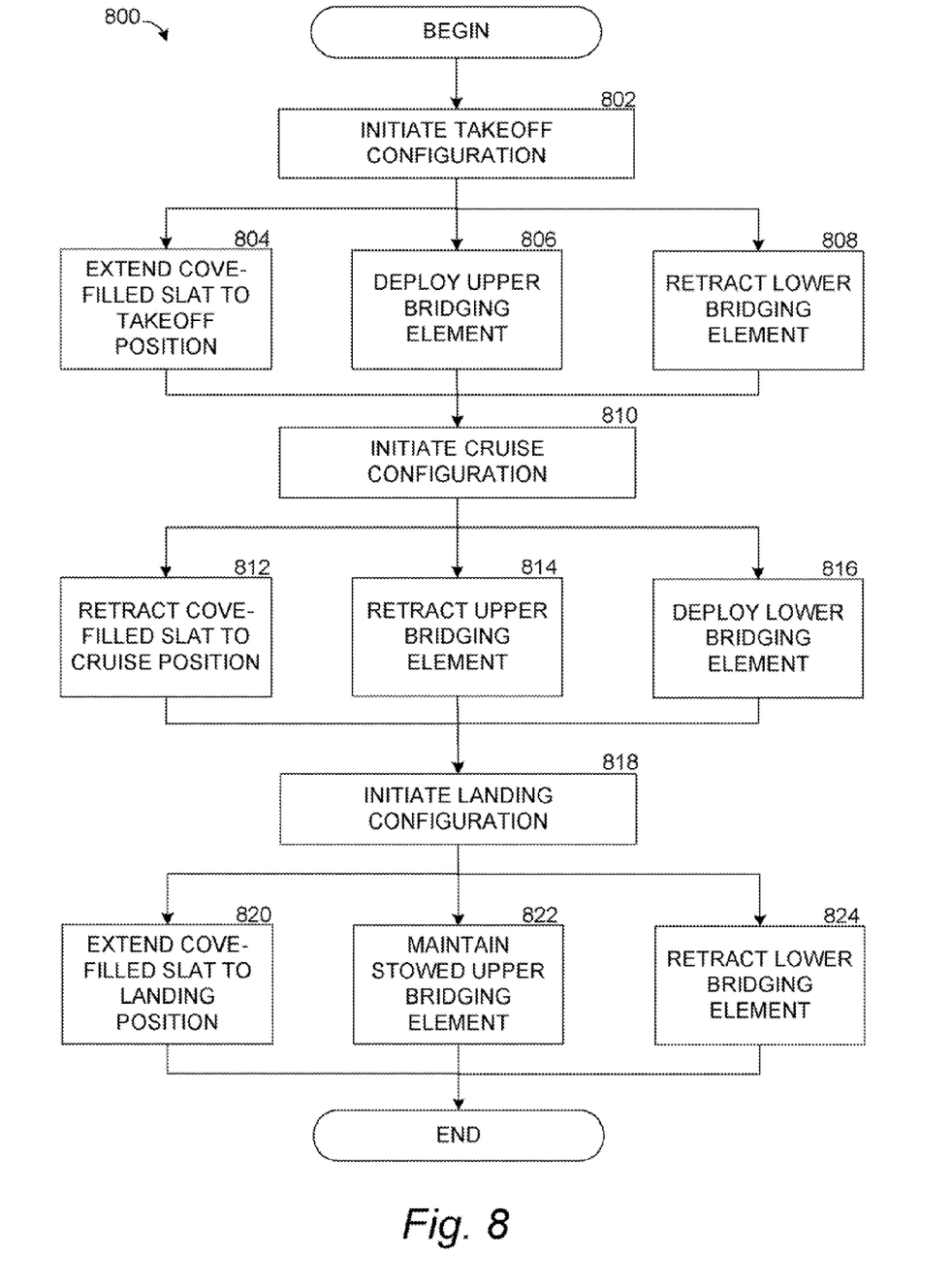
FIG. 8 is a flow diagram showing a method for reducing aircraft noise associated with a high lift system according to various embodiments presented herein.

Turning now to FIG. 8, an illustrative routine 800 for providing a reduced noise, high lift system for aircraft takeoff and landing operations will now be described in detail. It should be appreciated that more or fewer operations may be performed than shown in the figures and described herein. These operations may also be performed in a different order than those described herein.

The routine 800 begins at operation 802, where the high lift system 300 is configured for takeoff. The takeoff configuration may be initiated via a cockpit switch or toggle, or by a flight computer system upon detection and analysis of any quantity and type of criteria that indicates that the deployment of the cove-filled slats 202 is desirable and proper. Upon initiating the takeoff configuration of the high lift system 300, the routine 800 continues substantially simultaneously to operations 804, 806, and 808. At operation 804, the cove-filled slat 202 is extended to the high lift position from the stowed position. At operation 806, the upper bridging element 302 is deployed to create the continuous aerodynamic surface between the cove-filled slat 202 and an upper surface of the leading edge 310 of the aircraft wing 306.

As described above with respect to the high lift systems 300A-300C, this deployment of the upper bridging element 302 may originate from the cove-filled slat 202 or from the aircraft wing 306 depending on the stowed location of the bridging element. Moreover, the deployment may be effectuated utilizing a slat trailing edge mechanism 502, a rotary actuator and pinion gear 602 combination, or a linear actuator 702, among other mechanisms. At operation 808, the lower bridging element 304 is retracted into the aircraft wing 306 for takeoff operations. Although not shown, it should be appreciated that the deployment of the cove-filled slat 202 may occur simultaneously with the deployment of the flap 108, which increases the lift created by the aircraft wing 104.

After takeoff is complete and the high lift system 300 is no longer needed, it is configured for cruise flight at operation 810. As with the activation of the high lift system 300 for takeoff, the reconfiguration for cruise flight may be via a manual selection of a switch or toggle, or may be automated by a flight computer according to current flight criteria. Upon initiation of the cruise flight configuration of the high lift system 300, the routine 800 continues substantially simultaneously to operations 812, 814, and 816. At operation 812, the cove-filled slat 202 is retracted until the slat abuts the leading edge 310 of the aircraft wing 306. At operation 814, the upper bridging element 302 is retracted via the same means used to deploy the element. At operation 816, the lower bridging element 304 is deployed to create the continuous aerodynamic surface between the lower surface of the slat and the lower surface of the aircraft wing 306. Although not shown, it should again be appreciated that the retraction of the cove-filled slat 202 may occur simultaneously with the retraction of the flap 108.

At the appropriate time during landing preparation, at operation 818, the high lift system 300 is configured for landing. This reconfiguration from the cruise flight configuration to the landing configuration may be via a manual selection of a switch or toggle, or may be automated by a flight computer according to current flight criteria. Upon initiation of the landing configuration of the high lift system 300, the routine 800 continues substantially simultaneously to operations 820, 822, and 824. At operation 820, the cove-filled slat 202 is extended to the landing position. At operation 822, the upper bridging element 302 is maintained in the stowed position within the aircraft wing 306 or within the cove-filled slat 202, depending on the implementation. At operation 824, the lower bridging element 304 is retracted to the stowed position within the aircraft wing 306, and the routine 800 ends. Although not shown, it should again be appreciated that the deployment of the cove-filled slat 202 may occur simultaneously with the deployment of the flap 108.

It should be appreciated from the above disclosure that the concepts presented herein provide a solution to the negative affect that conventional slats 102 have on the creation of noise during takeoff and landing operations. In addition to reducing the noise associated with the recirculation 106 in the cove region of conventional slats 102, the use of cove-filled slats 202 and corresponding upper and lower bridging elements (302, 304) has a benefit of enhancing the takeoff performance of an aircraft.

By filling in the cove region of the conventional slats 102 and eliminating the air recirculation 106, the drag associated with the air recirculation 106 is significantly reduced. A reduction in drag allows for an increased aircraft payload, an increase in aircraft range, a decreased runway distance, and/or smaller engines since less thrust is required to overcome the airplane drag. A decrease in the engine size and/or thrust output has direct and favorable implication to aircraft weight, fuel consumption, and general eco-friendliness.

Based on the foregoing, it should be appreciated that technologies for providing a low noise, high lift system have been disclosed herein. It is to be understood that the invention defined in the appended claims is not necessarily limited to the specific features, configurations, acts, or media described herein. Rather, the specific features, configurations, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A method for reducing aircraft noise associated with a high-lift system, comprising:
deploying a slat from a fixed leading edge of an aircraft wing to a takeoff position; and separately deploying an independent upper bridging element by sliding the independent upper bridging element from a stowed position to a deployed position that creates a continuous aerodynamic surface between the slat and an upper surface of the fixed leading edge of the aircraft wing, during takeoff the upper bridging element bridges a gap between the slat and the upper surface of the fixed leading edge, during cruise and landing the upper bridging element is either (1) mostly on or within the slat or (2) mostly on the wing.

2. The method of claim 1, wherein deploying the independent upper bridging element from a stowed position on the aircraft wing to the deployed position comprises pulling the independent upper bridging element from the stowed position with a slat trailing edge mechanism as the slat deploys to the takeoff position, the slat not being deployed by the slat trailing edge mechanism.

3. The method of claim 1, wherein deploying the independent upper bridging element from a stowed position on the aircraft wing to the deployed position comprises extending the independent upper bridging element from the stowed position utilizing an actuator mounted within the aircraft wing, the slat not being deployed by the actuator.

4. The method of claim 1, wherein the stowed position comprises a position on or within the slat.

5. The method of claim 4, wherein deploying the independent upper bridging element from the stowed position on or within the slat to the deployed position comprises extending the independent upper bridging element from the stowed position utilizing a rotary actuator and pinion gear positioned within the slat.

6. The method of claim 4, wherein deploying the independent upper bridging element from the stowed position on or within the slat to the deployed position comprises extending the independent upper bridging element from the stowed position utilizing a linear actuator positioned within the slat.

7. The method of claim 1, further comprising retracting a lower bridging element by sliding the lower bridging element from a deployed position that creates a continuous aerodynamic surface between a lower surface of the slat and a lower surface of the aircraft wing to a stowed position that creates a gap between the lower surface of the slat and the lower surface of the aircraft wing.

8. The method of claim 7, wherein the stowed position corresponding to the lower bridging element comprises a position on or within the aircraft wing, and wherein retracting the lower bridging element comprises linearly retracting the lower bridging element toward the aircraft wing to the stowed position.

9. The method of claim 7, and, for cruise flight conditions, further comprising:
retracting the slat to a stowed position abutting the fixed leading edge of an aircraft wing;
retracting the upper bridging element to the stowed position; and
deploying the lower bridging element from the stowed position to the deployed position that creates a continuous aerodynamic surface between the lower surface of the slat and the lower surface of the aircraft wing.

10. The method of claim 9, and, for landing conditions, further comprising:
deploying the slat from the stowed position abutting the fixed leading edge of an aircraft wing to a landing position;
maintaining the upper bridging element in the stowed position; and
retracting the lower bridging element from the deployed position to the stowed position.

11. A high lift system, comprising:
a leading edge wing slat; an aircraft wing having an upper surface, a lower surface, and a fixed leading edge; a separately deployable and slideable independent upper bridging element configured to deploy when the leading edge wing slat is deployed to a takeoff position such that the deployable and slideable independent upper bridging element creates a continuous aerodynamic surface between the leading edge wing slat and an upper surface of the fixed leading edge of the aircraft wing; and
a separately deployable and slideable lower bridging element configured to deploy from the lower surface of the aircraft wing when the leading edge wing slat is positioned in a stowed position abutting the fixed leading edge of the aircraft wing such that the deployable and slideable lower bridging element creates a continuous aerodynamic surface between the leading edge wing slat and a lower surface of the fixed leading edge of the aircraft wing, during takeoff the upper bridging element bridges a gap between the slat and the upper surface of the fixed leading edge, during cruise and landing the upper bridging element is either (1) mostly on or within the slat or (2) mostly on the wing.

12. The high lift system of claim 11, wherein the deployable and slideable independent upper bridging element is positioned on the aircraft wing when configured in a stowed position.

13. The high lift system of claim 12, wherein the leading edge wing slat comprises a slat trailing edge mechanism configured to couple with the deployable and slideable independent upper bridging element such that when the leading edge wing slat deploys to the takeoff position, the slat trailing edge mechanism pulls the deployable and slideable independent upper bridging element from the stowed position on the aircraft wing to a deployed position bridging the leading edge wing slat and an upper surface of the fixed leading edge of the aircraft wing.

14. The high lift system of claim 12, further comprising an actuator positioned within the aircraft wing configured to extend the deployable and slideable independent upper bridging element from the stowed position on the aircraft wing to a deployed position bridging the leading edge wing slat and an upper surface of the fixed leading edge of the aircraft wing.

15. The high lift system of claim 11, wherein the deployable and slideable independent upper bridging element is positioned on the leading edge wing slat when configured in a stowed position.

16. The high lift system of claim 15, wherein the leading edge wing slat comprises a rotary actuator and pinion gear or a linear actuator coupled to the deployable and slideable independent upper bridging component and configured to extend and retract the deployable and slideable independent upper bridging element between the stowed position and a deployed position.

17. A method for reducing aircraft noise associated with a high lift system, comprising:
deploying a slat from a stowed slat position abutting a fixed leading edge of an aircraft wing to a takeoff slat position;
substantially concurrently with deploying the slat to the takeoff slat position, separately deploying an independent upper bridging element by sliding the independent upper bridging element from a stowed bridging element position to a deployed bridging element position that creates a continuous aerodynamic surface between the slat and an upper surface of the fixed leading edge of the aircraft wing, the stowed bridging element position being proximate to the upper surface of the fixed leading edge of the aircraft wing, during takeoff the upper bridging element bridges a gap between the slat and the upper surface of the fixed leading edge, during cruise and landing the upper bridging element is either (1) mostly on or within the slat or (2) mostly on the wing;

retracting the slat from the takeoff slat position to the stowed slat position for cruise flight; substantially concurrently with retracting the slat to the stowed slat position, separately retracting the independent upper bridging element by sliding the upper bridging element to the stowed bridging element position;

deploying the slat from the stowed slat position to a landing slat position; and maintaining the independent upper bridging element in the stowed bridging element position when the slat is deployed in the landing slat position.

18. The method of claim 17, further comprising:

substantially concurrently with deploying the slat to the takeoff position, linearly retracting a lower bridging element from a deployed lower bridging element position that creates a continuous aerodynamic surface between a lower surface of the slat and a lower surface of the aircraft wing to a stowed lower bridging element position on or within the aircraft wing.

* * * * *